(12) United States Patent
Edwards

(10) Patent No.: US 7,862,218 B2
(45) Date of Patent: Jan. 4, 2011

(54) POINT SOURCE APPARATUS AND METHOD OF MANUFACTURE THEREOF

(75) Inventor: Nicholas Edwards, Stockbridge (GB)

(73) Assignee: Interconnect Limited, Andover, Hampshire (GB)

( * ) Notice: Subject to any disclaimer, the term of this patent is extended or adjusted under 35 U.S.C. 154(b) by 0 days.

(21) Appl. No.: 12/295,880

(22) PCT Filed: Jun. 1, 2007

(86) PCT No.: PCT/GB2007/050312
§ 371 (c)(1),
(2), (4) Date: Feb. 4, 2009

(87) PCT Pub. No.: WO2007/113599
PCT Pub. Date: Oct. 11, 2007

(65) Prior Publication Data
US 2009/0161206 A1    Jun. 25, 2009

(30) Foreign Application Priority Data
Apr. 3, 2006    (GB)    .................. 0606605.4

(51) Int. Cl.
*F21V 33/00*    (2006.01)
(52) U.S. Cl. ........................ 362/555; 362/575; 362/800; 362/249.02
(58) Field of Classification Search ................. 362/800, 362/572, 574, 575, 555, 249.02
See application file for complete search history.

(56) References Cited

U.S. PATENT DOCUMENTS

2003/0151735 A1*   8/2003  Blumenfeld et al. ........... 356/73
2003/0230728 A1*  12/2003  Dai et al. .................. 250/458.1
2007/0211460 A1*   9/2007  Ravkin ....................... 362/231

* cited by examiner

*Primary Examiner*—Laura Tso
(74) *Attorney, Agent, or Firm*—Bracewell & Giuliani LLP

(57) ABSTRACT

A point electromagnetic radiation source apparatus (200) for fluorescence microscopy comprises an array of individually unpackaged light emitting diodes. A lightguide (102) is coupled to the array of individually unpackaged light emitting diodes (202) by abutment, the lightguide having a coupling window (210) that receives electromagnetic radiation emitted by the array of individually unpackaged 10 light emitting diodes (202).

13 Claims, 2 Drawing Sheets

POINT SOURCE APPARATUS AND METHOD OF MANUFACTURE THEREOF

RELATED APPLICATION

Figure 1:
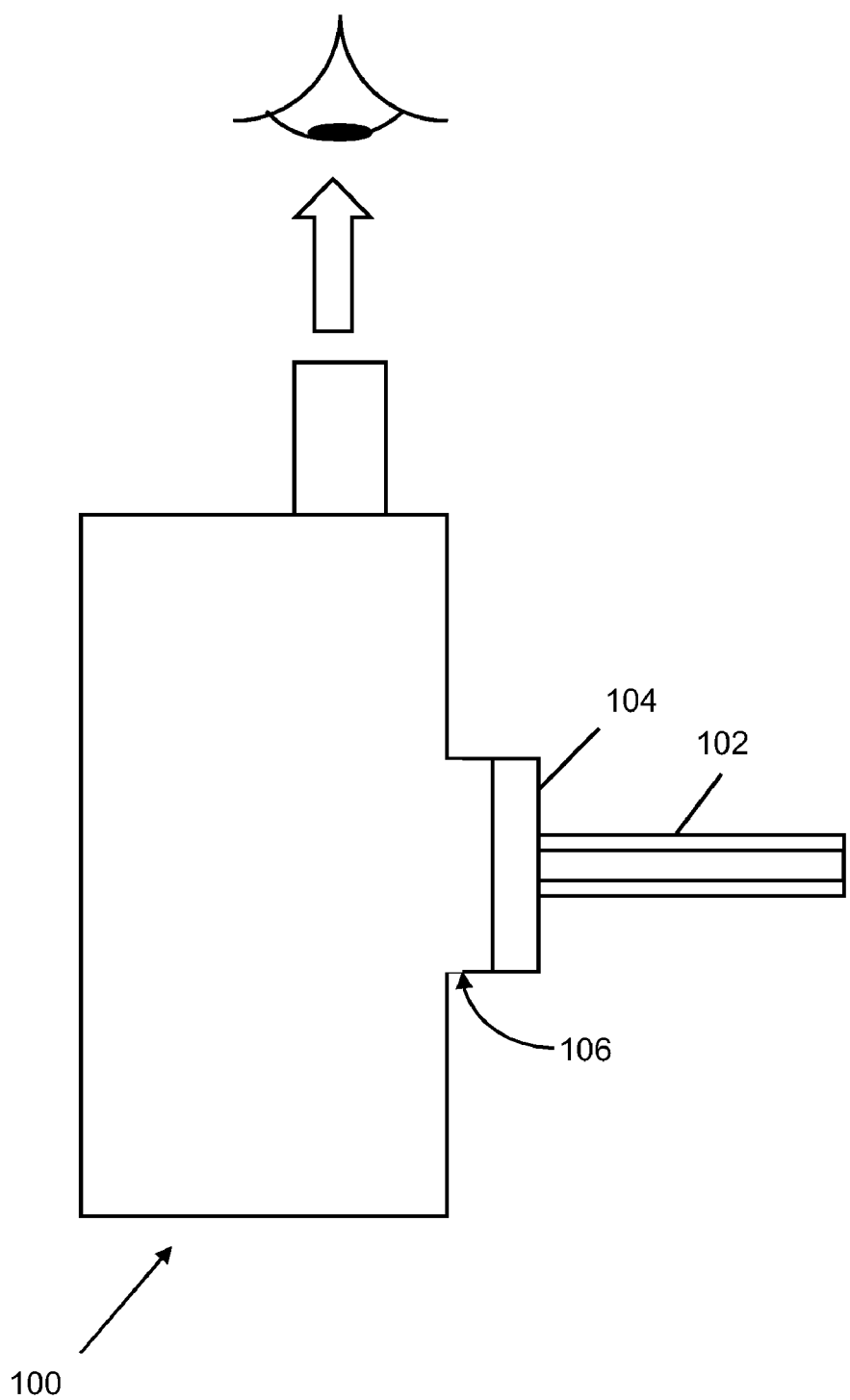

This application claims priority to PCT application PCT/GB2007/050312 filed Jun. 1, 2007, which claimed priority to British patent application GB 0606605.4, filed Apr. 3, 2006.

The present invention relates to a point source apparatus of the type that, for example, provides electromagnetic radiation for florescence microscopy. The present invention also relates to a method of manufacturing a point source apparatus of the type that, for example, provides electromagnetic radiation for florescence microscopy.

In the field of fluorescence microscopy, a specimen to be studied is made to fluoresce by emission of energy detectable as light when the specimen is irradiated with light of a specific wavelength. Some molecules fluoresce naturally, whereas other specimens have to be treated specifically with fluorescing chemicals to achieve fluorescence in the manner described above.

In order to perform fluorescence microscopy, a so-called "fluorescence microscope" is employed whereby the specimen is irradiated with excitation light. The excitation light is obtained from a collimated light source after filtering the light emitted by the collimated light source to ensure that the excitation light is of a wavelength that matches a fluorescing wavelength of the specimen.

As a result of irradiating the specimen with the excitation light, the specimen emits light of a lower energy than the excitation light and has a longer wavelength than the excitation light. This fact is exploited by the fluorescence microscope by filtering in order to separate the emitted light from the excitation light so that an image of the specimen can be observed using the microscope; fluorescing areas of the specimen can be observed in the microscope and stand out against a dark background with high contrast.

As mentioned above, the fluorescence microscope requires a collimated source of electromagnetic radiation in order to be able to generate the excitation light. Typically, this point source is achieved using a mercury lamp, since the mercury lamp delivers high levels of optical power and a spectra that has a multitude of peaks at various wavelengths in the electromagnetic spectrum. However, as is apparent from the above-described need to filter the electromagnetic radiation emitted by the point source, much of the electromagnetic radiation emitted by the mercury lamp is in unwanted wavebands. Further, mercury lamps have a limited life of about 500 to 1000 hours and are characterized by a steady drop off in power over this time. Additionally mercury lamps normally require a minimum of 10 to 15 minutes to warm-up prior to use and so during continuous study of specimens, the mercury lamp is normally left powered-up, which reduces the already short life of the mercury lamp and is generally inefficient and wasteful of power. Mercury lamps are also very fragile and are easily damaged by mechanical shock.

Developments in Light Emitting Diode (LED) technology have resulted in the production of so-called "ultra-bright" Light Emitting Diodes (LEDs), the use of which as a point source for fluorescence microscopy has been proposed. Indeed, not only are such solid state light sources capable of emitting greater intensities of light than before, but they are also available in a wider range of wavelengths, from near visible Ultra-violet (UV) electromagnetic radiation through the visible electromagnetic spectrum to IR electromagnetic radiation. However, whilst individual LED devices produce small point sources of light, many of the applications require an even distribution of light intensity over a controlled area. Whilst large arrays of LEDs can be produced to create a "flood" of illumination, intensity over the controlled area is very uneven and follows an inverse-square law in relation to distance from the source and so attenuates considerably with increasing distance from the source. Hence, in order to maintain intensity at increasing distances, a level of collimation can be introduced by use of lenses or reflectors. In this respect, it is known to dispose an LED within an elaborate parabolic concave reflective housing in order to collimate light emitted by the LED. However, the laws of physics, and in particular geometric optics, dictate that the optical components used are at least five to ten times larger than the light source before any degree of collimation can be achieved. Hence, introduction of reflectors or lenses reduce the ability to create a high-density array of individual LEDs and hence create a high intensity light source. Thus, hitherto, use of LEDs as a point source is a poor substitute for the mercury lamp in fluorescence microscopy.

It is therefore an object of the present invention to obviate or at least mitigate the above described problems.

According to a first aspect of the present invention, there is provided a point electromagnetic radiation source apparatus for fluorescence microscopy, the apparatus comprising: an array of individually unpackaged solid state optoelectronic structures; a light diffuser having a coupling window that receives, when in use, electromagnetic radiation emitted by the array of individually unpackaged solid state optoelectronic structures; wherein the array is arranged with respect to the light diffuser so as to couple, when in use, the electromagnetic radiation into the light diffuser through the coupling window.

The light diffuser may be a lightguide. The lightguide may be flexible. The cross-sectional area of the coupling window may be circular. The coupling window may have a diameter of at least about 1.5 mm.

The array of unpackaged solid state optoelectronic structures may substantially abut the coupling window.

The unpackaged solid state optoelectronic structures may be die-mounted. The array of unpackaged solid state optoelectronic structures may have substantially no inter-structure spacing. The array of unpackaged solid state optoelectronic structures may comprise a sufficient number of optoelectronic structures occupying a collective surface area corresponding to at least the surface area of the coupling window, for example at least about 50 unpackaged solid state optoelectronic structures.

The array of unpackaged solid state optoelectronic structures may be an array of light emitting diodes.

According to a second aspect of the present invention, there is provided a collimated electromagnetic radiation source apparatus comprising: the point electromagnetic radiation source apparatus as set forth above in relation to the first aspect of the invention, the point electromagnetic radiation source apparatus having an output end arranged to emit the electromagnetic radiation therefrom; and an optical element coupled to the output end in order to collimate, when in use, the electromagnetic radiation, the electromagnetic radiation emitted at the output end being uncollimated.

A collimating lens system may be coupled to the output end, the collimating lens system comprising the optical element. The collimating lens system may have a diameter of at least 5 times greater than the diameter of the coupling window, for example at least 10 mm. The collimating lens system may have a diameter of at least about 30 mm, for example at least about 40 mm.

According to a third aspect of the present invention, there is provided a method of manufacturing a point electromagnetic radiation source apparatus for fluorescence microscopy, the method comprising: providing an array of individually unpackaged solid state optoelectronic structures; providing a light diffuser having a coupling window that receives, when in use, electromagnetic radiation emitted by the array of individually unpackaged solid state optoelectronic structures; and arranging the array with respect to the light diffuser so as to couple, when in use, the electromagnetic radiation into the light diffuser through the coupling window.

It is thus possible to provide a point source apparatus and a method of manufacture thereof that is capable of emitting excitation light in a desired narrow waveband of electromagnetic radiation that can be switched on and off almost instantaneously without the need for a warm-up period. Additionally, the point source apparatus maximizes flux density of light emitted by the array and so emits electromagnetic radiation of a sufficiently high intensity. Further, the apparatus has a much longer life span than mercury lamps (typically, 10,000 to 100,000 hours) with only a minor reduction in power over the lifetime of the point source apparatus. Further, no environmentally hazardous mercury is used to generate the excitation light.

Figure 2:
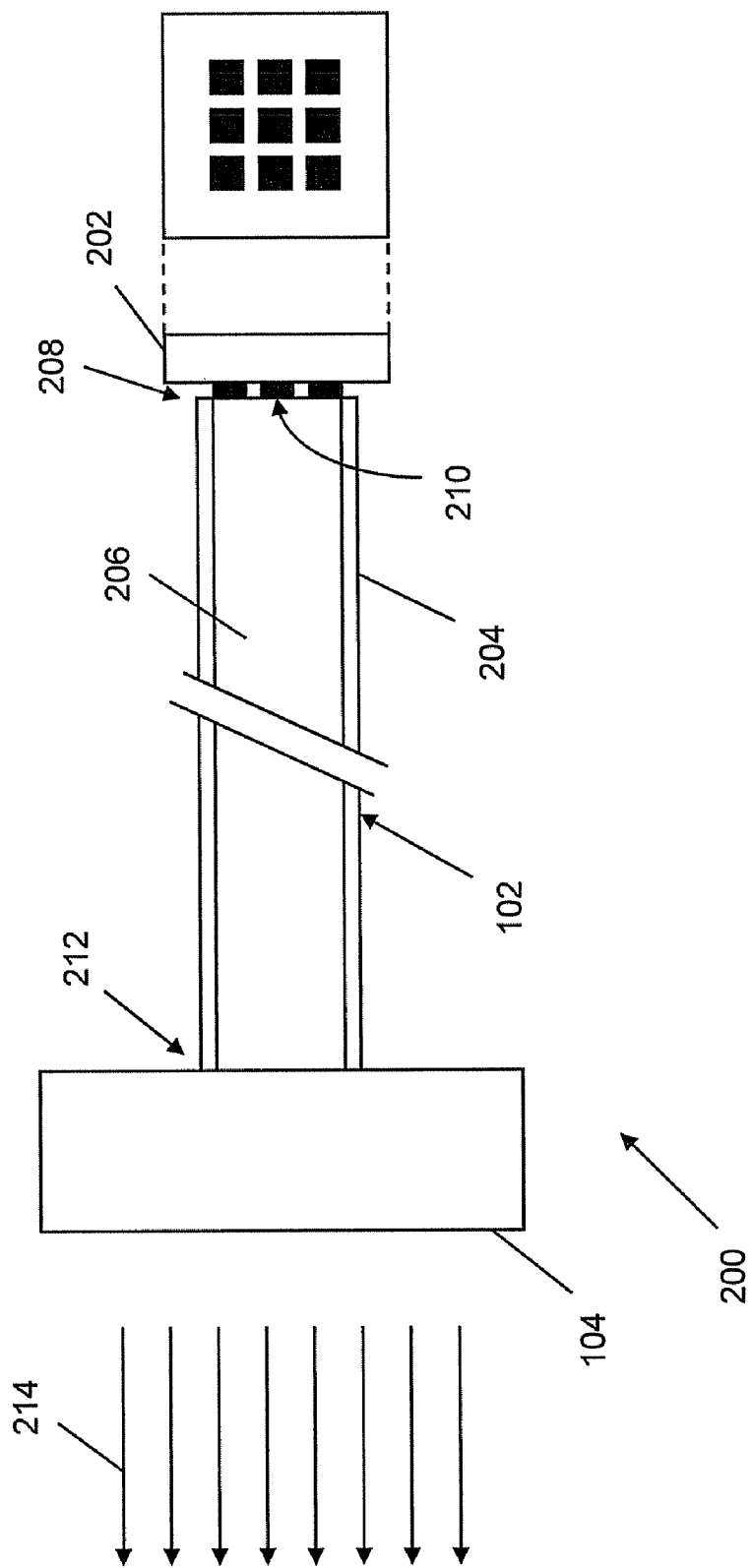

At least one embodiment of the invention will now be described, by way of example only, with reference to the accompanying drawings, in which:

FIG. 1 is a schematic diagram of a fluorescence microscope using a point source of electromagnetic radiation constituting an embodiment of the invention; and FIG. 2 is a schematic diagram of the light source of FIG. 1.

Throughout the following description identical reference numerals will be used to identify like parts.

Referring to FIG. 1, a fluorescence microscope 100 comprises a collimated light source (only shown in part in FIG. 1) including a lightguide 102 and a collimating lens system 104. The microscope 100 comprises an input port 106 for coupling the lens system 104 and hence the collimated light source to the microscope 100 for use in fluorescence microscopy analysis.

Turning to FIG. 2, the light source 200 comprises an array of unpackaged solid state optoelectronic structures 202 that have a collective surface area that can overlie at least a coupling window (described later herein), for example between about 50 and about 100 structures, such as 48 structures. In this example, the array of solid state structures is an array of unpackaged Light Emitting Diodes (LEDs). The unpackaged LEDs 202 are die-mounted with substantially no inter-device spacing. However, the skilled persons will appreciate that the quality of individual unpackaged devices and the inter-device spacing can be varied.

The array of unpackaged LEDs 202 can be fabricated using any suitable known semiconductor (or other) processing technique for the manufacture of optoelectronic devices. However, the skilled person will recognize that it is advantageous to employ a cooling arrangement thermally coupled to the high density LED array, because such arrays are known to generate heat that needs to be removed from the array of LEDs. In this example, a thermoelectric cooler, such as a Peltier device, is employed and heat is extracted from a hot side of the thermoelectric cooler by a heatpipe-enhanced forced air cooled heatsink. For the sake of clarity and conciseness of description, the above cooling arrangement will not be described in further detail herein.

The lightguide 102 is, in this example, a fluid lightguide comprising a cladding layer 204 and an inner core 206. Consequently, the lightguide 102 is flexible. The lightguide 102 serves as a light diffuser and has appropriate passband properties in relation to generation of excitation light. The inner core 206 of the lightguide 102 further comprises a proximal end 208 having a coupling window 210, and a distal, output, end 212.

In this example, the cross-section of the inner core 206 is circular, having a diameter of 3 mm, though the skilled person will appreciate that the diameter of the inner core can be from about 1.5 mm.

The array of unpackaged LEDs is coupled to the lightguide 102 by abutment of the unpackaged LEDs with the coupling window 210 of the inner core 206 of the lightguide 102. The skilled person will appreciate that the array of unpackaged LEDs 202 does not come into contact with the coupling window 210, but rather substantially abuts the coupling window 210. In this respect, the array of unpackaged LEDs 202 is protected by a protective window (not shown), for example a glass window. The output end 212 of the lightguide 102 is coupled to the collimating lens system 104.

The collimating lens system 104 is any suitable known lens system capable of collimating light emitted from a point source, for example a piano-convex lens or a compound lens system. The diameter of the lens(es) (not shown) in the lens system 104 is at least five times larger than the diameter of the coupling window 210, for example 10 mm, such as 40 mm.

In operation, the array of LEDs 202 is powered-up and illuminate almost instantaneously. Light emitted by the array of LEDs 202 is coupled into the lightguide 102 though the coupling window 210 by virtue of the abutment of the array of LEDs 202 with the coupling window 210. The light coupled into the inner core 206 of this lightguide 102 propagates along the lightguide 102, the coupled light being diffused during propagation therethrough.

At the output end 212 of the lightguide 102, light is output, effectively, as a point light source, in effect, the individual LEDs, effectively individual point sources, contribute to the single point source at the output end 212. The output point source light is received by the collimating lens system 104 and converted to collimated light 214 to serve, after filtering by the microscope 100, as the excitation light.

Although reference has been made herein to "light", the skilled person will appreciate that the solid state optoelectronic structures can be selected so as to provide electromagnetic radiation in a range of electromagnetic radiation wavelengths from about a lowermost wavelength of the ultra-violet light range to about an uppermost wavelength of the infra-red light range of the electromagnetic spectrum.

What is claimed is:

1. A point electromagnetic radiation source apparatus for fluorescence microscopy, the apparatus comprising:

an array of individually unpackaged solid state optoelectronic structures;

a light diffuser having a coupling window that receives, when in use, electromagnetic radiation emitted by the array of individually unpackaged solid state optoelectronic structures; wherein the array is arranged with respect to the light diffuser so as to couple, when in use, the electromagnetic radiation into the light diffuser through the coupling window;

the light diffuser is a lightguide; and wherein the light diffuser is flexible.

2. The apparatus according to claim 1, wherein the array of unpackaged solid state optoelectronic structures substantially abuts the coupling window.

3. The apparatus according to claim 1, wherein the cross-sectional area of the coupling window is circular.

4. The apparatus according to claim 3, wherein the coupling window has a diameter of at least 1.5 mm.

5. The apparatus according to claim 1, wherein the unpackaged solid state optoelectronic structures are die-mounted.

6. The apparatus according to claim 1, wherein the array of unpackaged solid state optoelectronic structures has substantially no inter-structure spacing.

7. The apparatus according to claim 1, wherein the array of unpackaged solid state optoelectronic structures comprises at least about 50 unpackaged solid state optoelectronic structures.

8. The apparatus according to claim 1, wherein the array of unpackaged solid state optoelectronic structures is an array of light emitting diodes.

9. A point electromagnetic radiation source apparatus for fluorescence microscopy, the apparatus comprising:
   an array of individually unpackaged solid state optoelectronic structures;
   a light diffuser having a coupling window that receives, when in use, electromagnetic radiation emitted by the array of individually unpackaged solid state optoelectronic structures; wherein
   the array is arranged with respect to the light diffuser so as to couple, when in use, the electromagnetic radiation into the light diffuser through the coupling window;
   the light diffuser is a lightguide; and
   a collimated electromagnetic radiation source apparatus comprising:
   the point electromagnetic radiation source apparatus having an output end arranged to emit the electromagnetic radiation therefrom; and
   an optical element coupled to the output end in order to collimate, when in use,
   the electromagnetic radiation, the electromagnetic radiation emitted at the output end being uncollimated.

10. The apparatus according to claim 9, further comprising a collimating lens system coupled to the output end, the collimating lens system comprising the optical element.

11. The apparatus according to claim 10, wherein the collimating lens system has a diameter of at least 10 mm.

12. A point electromagnetic radiation source apparatus for fluorescence microscopy, the apparatus comprising:
   an array of individually unpackaged solid state optoelectronic structures;
   a light diffuser having a coupling window that receives, when in use, electromagnetic radiation emitted by the array of individually unpackaged solid state optoelectronic structures; wherein
   the array is arranged with respect to the light diffuser so as to couple, when in use, the electromagnetic radiation into the light diffuser through the coupling window;
   the light diffuser is a light guide; and
   a microscope apparatus comprising: a lens system; an input port for coupling to the lens system; and wherein the lens system is coupled to the point electromagnetic radiation source apparatus.

13. A microscope apparatus comprising:
   a lens system;
   an input port for coupling to the lens system; wherein
   the lens system is coupled to the collimated electromagnetic radiation source according to claim 9.

* * * * *